(12) United States Patent
Kawauchi et al.

(10) Patent No.: US 11,465,507 B2
(45) Date of Patent: Oct. 11, 2022

(54) ABNORMALITY MONITORING DEVICE, ABNORMALITY MONITORING METHOD, AND PROGRAM

(71) Applicant: Mitsubishi Heavy Industries Engineering, Ltd., Kanagawa (JP)

(72) Inventors: Akihisa Kawauchi, Tokyo (JP); Hiroyuki Kono, Tokyo (JP); Koji Uchida, Tokyo (JP); Katsuya Kuroki, Tokyo (JP); So Tamura, Tokyo (JP)

(73) Assignee: MITSUBISHI HEAVY INDUSTRIES ENGINEERING, LTD., Kanagawa (JP)

( * ) Notice: Subject to any disclaimer, the term of this patent is extended or adjusted under 35 U.S.C. 154(b) by 657 days.

(21) Appl. No.: 16/473,376

(22) PCT Filed: Feb. 16, 2018

(86) PCT No.: PCT/JP2018/005577
§ 371 (c)(1),
(2) Date: Jun. 25, 2019

(87) PCT Pub. No.: WO2018/155348
PCT Pub. Date: Aug. 30, 2018

(65) Prior Publication Data
US 2020/0148237 A1 May 14, 2020

(30) Foreign Application Priority Data
Feb. 23, 2017 (JP) .............................. JP2017-032613

(51) Int. Cl.
*B60L 3/00* (2019.01)
*B61L 15/00* (2006.01)
*B61L 25/02* (2006.01)

(52) U.S. Cl.
CPC .............. *B60L 3/00* (2013.01); *B61L 15/0081* (2013.01); *B61L 25/021* (2013.01)

(58) Field of Classification Search
CPC ........ B60L 3/00; B61L 15/00; B61L 15/0081; B61L 25/00; B61L 25/02; B61L 25/021
See application file for complete search history.

(56) References Cited

U.S. PATENT DOCUMENTS

| 9,841,286 B1 | 12/2017 | Hayward |
| 2007/0203621 A1 | 8/2007 | Haugen et al. |

(Continued)

FOREIGN PATENT DOCUMENTS

| EP | 2436574 A1 | 4/2012 |
| JP | 2004108988 A | 4/2004 |

(Continued)

OTHER PUBLICATIONS

Office Action for U.S. Appl. No. 16/173,538 dated Aug. 24, 2020; 8pp.

(Continued)

*Primary Examiner* — Tyler J Lee
(74) *Attorney, Agent, or Firm* — Kanesaka Berner and Partners LLP

(57) ABSTRACT

This abnormality monitoring device is equipped with: an acceleration data acquisition unit for acquiring measurement data about the acceleration of a vehicle chassis; an abnormality presence determination unit for determining whether an abnormality is present on the basis of a comparison between the acceleration and a threshold; a frequency analysis unit for analyzing the acceleration frequency when the abnormality presence determination unit determines that an abnormality is present, and an abnormality type identification unit for identifying abnormality type on the basis of the frequency pattern.

6 Claims, 5 Drawing Sheets

(56) References Cited

U.S. PATENT DOCUMENTS

| | | |
|---|---|---|
| 2008/0234964 A1 | 9/2008 | Miyasaka et al. |
| 2010/0185414 A1 | 7/2010 | Yamamoto |
| 2010/0262321 A1* | 10/2010 | Daum ............... B61L 15/009 701/19 |
| 2011/0231039 A1* | 9/2011 | Leitel ............... B60T 8/1893 701/19 |
| 2012/0197476 A1 | 8/2012 | Smith et al. |
| 2013/0173208 A1 | 7/2013 | Kuzunishi et al. |
| 2013/0342362 A1 | 12/2013 | Martin |
| 2015/0009331 A1 | 1/2015 | Venkatraman |
| 2015/0051792 A1 | 2/2015 | Kristen et al. |
| 2016/0152255 A1 | 6/2016 | Cuthbertson et al. |
| 2017/0021847 A1 | 1/2017 | Lefebvre et al. |
| 2017/0066459 A1 | 3/2017 | Singh |
| 2017/0106884 A1 | 4/2017 | Oswald |
| 2017/0199101 A1 | 7/2017 | Franchitti |
| 2017/0203745 A1 | 7/2017 | Kumar et al. |
| 2017/0210401 A1 | 7/2017 | Mian |
| 2017/0253258 A1 | 9/2017 | Bramucci et al. |
| 2017/0305396 A1 | 10/2017 | Shiratsuchi |
| 2017/0313332 A1 | 11/2017 | Paget et al. |
| 2019/0086364 A1 | 3/2019 | Hay et al. |
| 2019/0248392 A1 | 8/2019 | Bar-Tal et al. |
| 2019/0391049 A1 | 12/2019 | Jones |
| 2020/0023871 A1 | 1/2020 | Snyder et al. |
| 2020/0191913 A1 | 6/2020 | Zhang et al. |

FOREIGN PATENT DOCUMENTS

| | | |
|---|---|---|
| JP | 2006105956 A | 4/2006 |
| JP | 2006160153 A | 6/2006 |
| JP | 2006327551 A | 12/2006 |
| JP | 2007256153 A | 10/2007 |
| JP | 2007278894 A | 10/2007 |
| JP | 2008100669 A | 5/2008 |
| JP | 2008108250 A | 5/2008 |
| JP | 201278213 A | 4/2012 |
| JP | 2012086671 A | 5/2012 |
| JP | 2012100434 A | 5/2012 |
| JP | 5432818 B | 12/2013 |
| JP | 5525404 B2 | 4/2014 |
| JP | 2015042106 A | 3/2015 |
| JP | 5691319 B2 | 4/2015 |
| JP | 2017026421 A | 2/2017 |

OTHER PUBLICATIONS

Office Action for U.S. Appl. No. 16/173,538 dated Apr. 13, 2020; 20pp.

International Search Report and Written Opinion for International Application No. PCT/JP2018/005577 dated Apr. 24, 2018; 14pp.

* cited by examiner

ABNORMALITY MONITORING DEVICE, ABNORMALITY MONITORING METHOD, AND PROGRAM

RELATED APPLICATIONS

The present application is a National Phase of International Application Number PCT/JP2018/005577 filed Feb. 16, 2018.

TECHNICAL FIELD

The present invention relates to an abnormality monitoring device, an abnormality monitoring method, and a program.

Priority is claimed on Japanese Patent Application No. 2017-32613, filed Feb. 23, 2017, the content of which is incorporated herein by reference.

BACKGROUND ART

Several techniques for detection of a vehicle abnormality have been proposed. For example, PTL 1 describes a state monitoring device for railway vehicle for detecting an abnormality by eliminating an influence of traveling speed dependency. The state monitoring device described in PTL 1 detects vibration in a horizontal direction of a vehicle chassis using an accelerometer and detects two different frequency band components from the detected vibration. This state monitoring device calculates an amplitude ratio between the detected two different frequency band components, and performs an abnormality determination by comparing the calculated amplitude ratio with a threshold.

CITATION LIST

Patent Literature

[PTL 1] Japanese Patent No. 5525404

SUMMARY OF INVENTION

Technical Problem

When an abnormality occurs in a vehicle, if information indicating a type of abnormality can be obtained as well as a determination as to whether an abnormality is present can be performed, this can be useful for study of measures against the abnormality.

However, PTL 1 does not disclose a method of acquiring information indicating a type of abnormality.

The present invention provides an abnormality monitoring device, an abnormality monitoring method, and a program capable of obtaining information indicating a type of abnormality when the abnormality occurs in a vehicle.

Solution to Problem

According to a first aspect of the present invention, an abnormality monitoring device includes an acceleration data acquisition unit that acquires measurement data of an acceleration of a vehicle chassis; an abnormality presence determination unit that determines whether an abnormality is present on the basis of comparison between the acceleration and a threshold; a frequency analysis unit that analyzes a frequency of the acceleration when the abnormality presence determination unit determines that an abnormality is present; and an abnormality type identification unit that identifies a type of abnormality on the basis of a pattern of the frequency.

When the abnormality type identification unit is unable to identify the type of abnormality from the pattern of the frequency, the abnormality type identification unit may identify the type of abnormality on the basis of the pattern of the frequency and a measurement result of the acceleration.

The abnormality type identification unit may determine whether to start identification of the type of abnormality on the basis of a travel pattern of a vehicle including the vehicle chassis.

The abnormality type identification unit may determine that an abnormality is likely to be on a track side when the abnormality presence determination unit determines that an abnormality is present in a certain section among sections of the track and determines that an abnormality is not present in other sections.

The acceleration data acquisition unit may acquire measurement data of an acceleration from a plurality of vehicle chassis, and the abnormality type identification unit may determine that an abnormality is likely to be on the track side when the abnormality presence determination unit determines that an abnormality is present in the same section among the sections of the track for each of pieces of measurement data of the acceleration from a plurality of vehicle chassis.

According to a second aspect of the present invention, an abnormality monitoring method includes steps of: acquiring measurement data of an acceleration of a vehicle chassis; determining whether an abnormality is present on the basis of comparison between the acceleration and a threshold; analyzing a frequency of the acceleration when it is determined that an abnormality is present; and identifying a type of abnormality on the basis of a pattern of the frequency.

According to a third aspect of the present invention, a program is a program for causing a computer to execute steps of: acquiring measurement data of an acceleration of a vehicle chassis; determining whether an abnormality is present on the basis of comparison between the acceleration and a threshold; analyzing a frequency of the acceleration when it is determined that an abnormality is present; and identifying a type of abnormality on the basis of a pattern of the frequency.

Advantageous Effects of Invention

According to the abnormality monitoring device, the abnormality monitoring method, and the program described above, it is possible to obtain information indicating the type of abnormality when an abnormality occurs in the vehicle.

DESCRIPTION OF EMBODIMENTS

Hereinafter, embodiments of the present invention will be described, but the following embodiments do not limit the inventions according to the claims. Further, not all combinations of characteristics described in the embodiments are essential to the solution of the invention.

First Embodiment

Figure 1:
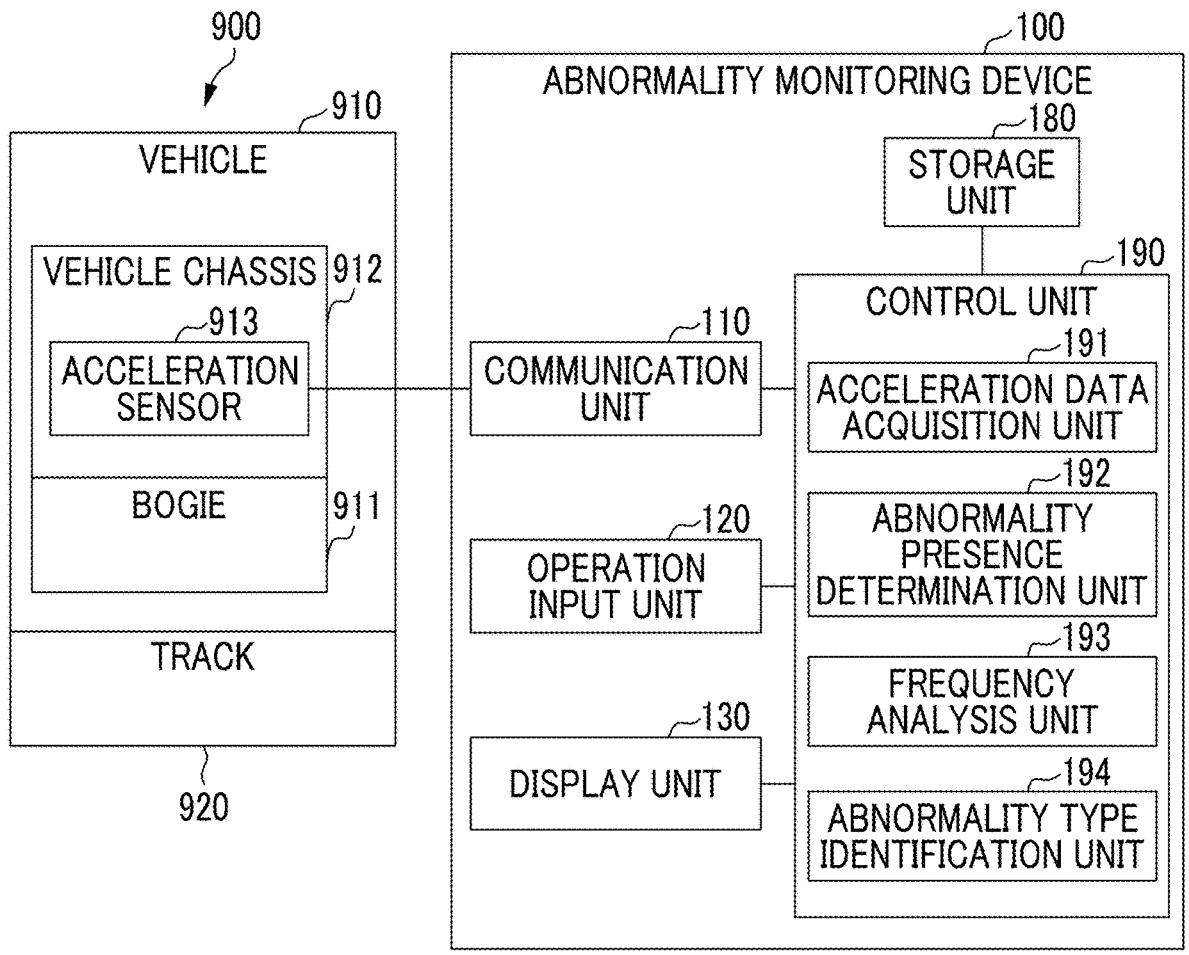
FIG. 1 is a schematic block diagram illustrating a functional configuration of an abnormality monitoring system according to a first embodiment.

FIG. 1 is a schematic block diagram illustrating a functional configuration of an abnormality monitoring system according to a first embodiment. As illustrated in FIG. 1, the abnormality monitoring device 100 includes a communication unit 110, an operation input unit 120, a display unit 130, a storage unit 180, and a control unit 190. The control unit 190 includes an acceleration data acquisition unit 191, an abnormality presence determination unit 192, a frequency analysis unit 193, and an abnormality type identification unit 194.

The abnormality monitoring device 100 monitors a traffic system 900. In the traffic system 900, a vehicle 910 travels on a track 920. The vehicle 910 includes a bogie 911 and a vehicle chassis 912. An acceleration sensor 913 is installed in the vehicle chassis 912. The acceleration sensor 913 measures an acceleration in each of a vertical direction, a horizontal direction, and a longitudinal direction in the vehicle chassis 912. Hereinafter, a case in which the traffic system 900 is an automated guideway transit (AGT; automatic guide rail transportation system) will be described by way of example. However, a monitoring target of the abnormality monitoring device 100 is not limited to the AGT, and may be a vehicle.

The abnormality monitoring device 100 detects occurrence of an abnormality when an abnormality occurs in the vehicle 910, and identifies a type of the abnormality. The abnormality monitoring device 100 is configured using, for example, a computer.

The abnormality monitoring device 100 may be mounted in a vehicle 910. Alternatively, the abnormality monitoring device 100 may be disposed outside the vehicle 910, such as the inside of a building.

The communication unit 110 communicates with other devices to transmit and receive various pieces of data. In particular, the communication unit 110 communicates with the acceleration sensor 913 to receive acceleration data indicating an acceleration of the vehicle chassis 912 measured by the acceleration sensor 913.

The operation input unit 120 includes, for example, input devices such as a keyboard and a mouse, and receives a user operation.

The display unit 130 includes a display screen such as a liquid crystal panel or a light emitting diode (LED) panel, and displays various pieces of data.

The storage unit 180 stores various pieces of data. The storage unit 180 is configured using a storage device included in the abnormality monitoring device 100.

The control unit 190 controls each unit of the abnormality monitoring device 100 to execute various processes. The control unit 190 is configured, for example, by a central processing unit (CPU) included in the abnormality monitoring device 100 reading a program from the storage unit 180 and executing the program.

The acceleration data acquisition unit 191 acquires measurement data of the acceleration of the vehicle chassis 912. Specifically, the acceleration data acquisition unit 191 selectively acquires the measurement data of the acceleration of the vehicle chassis 912 from the data received by the communication unit 110.

The abnormality presence determination unit 192 determines whether an abnormality is present on the basis of the comparison between the acceleration of the vehicle chassis 912 and a threshold. Specifically, the abnormality presence determination unit 192 compares each of an acceleration in a vertical direction, an acceleration in a horizontal direction, and an acceleration in a longitudinal direction of the vehicle chassis 912 with the threshold, and determines that an abnormality is present when a maximum value of an absolute value (a magnitude of the acceleration) of any of the accelerations is equal to or greater than the threshold. On the other hand, when any of the accelerations is smaller than the threshold, the abnormality presence determination unit 192 determines that an abnormality is not present.

Here, the threshold may be a preset constant. Further, the threshold may be different for the acceleration in the vertical direction, the acceleration in the horizontal direction, and the acceleration in the longitudinal direction.

When the abnormality presence determination unit 192 determines that an abnormality is present, the frequency analysis unit 193 performs frequency analysis of the acceleration to acquire frequency pattern data of the acceleration. For example, the frequency analysis unit 193 performs ⅓ octave band analysis on acceleration data in each of the vertical direction, the horizontal direction, and the longitudinal direction.

In the frequency pattern data, a magnitude of an amplitude is shown for each frequency. For example, when the frequency analysis unit 193 performs the ⅓ octave band analysis, an amplitude for each frequency band of ⅓ octave is shown in the frequency pattern data.

The abnormality type identification unit 194 identifies the type of abnormality on the basis of the frequency pattern obtained through the frequency analysis of the frequency analysis unit 193. When the type of abnormality cannot be identified from the frequency pattern, the abnormality type identification unit 194 identifies the type of abnormality on the basis of the frequency pattern and a measurement result of the acceleration.

Figure 2:
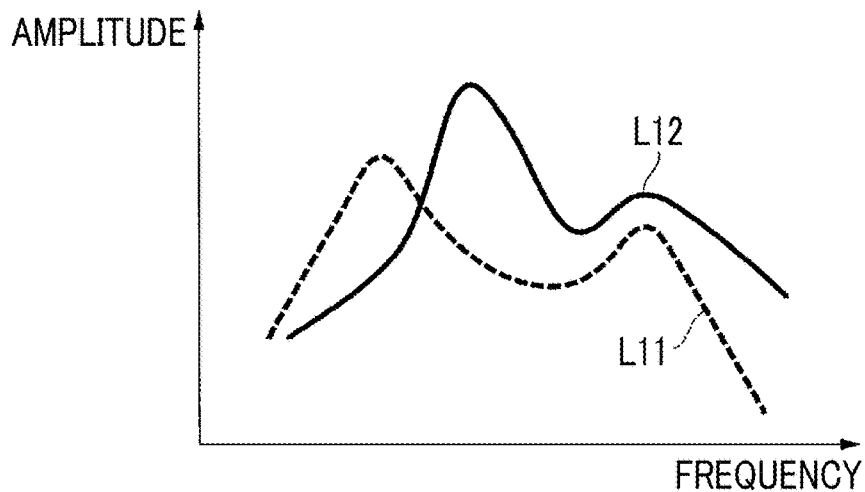
FIG. 2 is a graph illustrating an example of change in frequency of an acceleration when an abnormality occurs in a vehicle according to the first embodiment.

FIG. 2 is a graph illustrating an example of a change in a frequency of an acceleration when an abnormality occurs in the vehicle 910. A horizontal axis of FIG. 2 indicates the frequency, and a vertical axis indicates an amplitude. A line L11 indicates an example of an acceleration at an ordinary time. A line L12 indicates an example of the acceleration when an air spring is abnormal. This air spring is provided between the bogie 911 and the vehicle chassis 912. In the example of FIG. 2, rigidity of the vehicle 910 is increased and a natural frequency is higher than at an ordinary time due to the abnormality in the air spring.

The abnormality type identification unit 194 identifies the type of abnormality on the basis of such a change in frequency. For example, the storage unit 180 stores the type of abnormality and the frequency pattern of an acceleration in association with each other. The abnormality type identification unit 194 selects a pattern similar to the pattern of the frequency obtained through the analysis of the frequency analysis unit 193, and identifies a type of abnormality associated with this pattern.

Data in which the type of abnormality and the frequency pattern of an acceleration are associated with each other can be obtained, for example, by performing traveling simulation of the vehicle 910 or actual traveling such as experimental traveling in advance. The storage unit 180 may store the obtained data as a database of the acceleration.

The traveling simulation of the vehicle 910 is performed using, for example, a tire, an air spring, a horizontal motion damper, and a guide wheel as component parts. In the traveling simulation, for example, vertical, horizontal, and longitudinal vehicle floor accelerations and bogie accelerations are evaluation target. However, component parts and the evaluation targets are not limited to these, and can be additionally included or excluded.

In simulation in which failure has been simulated, for example, the failure is simulated by changing any one or a combination of spring stiffness, a damping coefficient, an amount of backlash, and the like of each part.

A track that is target may be divided into sections such as a straight part and a curved part, and simulation may be performed for each section to generate data. However, a method of dividing the section of the track is not limited to a specific method.

A vehicle in a track traffic system such as the AGT usually travel in a determined travel pattern. On the other hand, a weight of the vehicle varies with the number of passengers. Therefore, a simulation may be performed for a certain weight to generate a database of the acceleration.

In the generation of the database of the acceleration, frequency analysis of, for example, a ⅓ octave band may be performed on the obtained acceleration. A change in frequency characteristics for each type of abnormality such as each failure mode may be held as a database.

Further, main component analysis may be performed using an acceleration, and a maximum value, a minimum value, and an effective value of the acceleration, and the like as feature quantities, and main component scores may be calculated using an obtained main component load quantity. For example, when the number of feature quantities is N, the main component scores may be calculated up to an Nth-order main component score. By storing these results in the database, it becomes possible to discriminate which state an actual traveling state is close to.

For the effective value of the acceleration, for example, the effective value of the acceleration may be calculated from acceleration data for a predetermined time during traveling.

Figure 3:
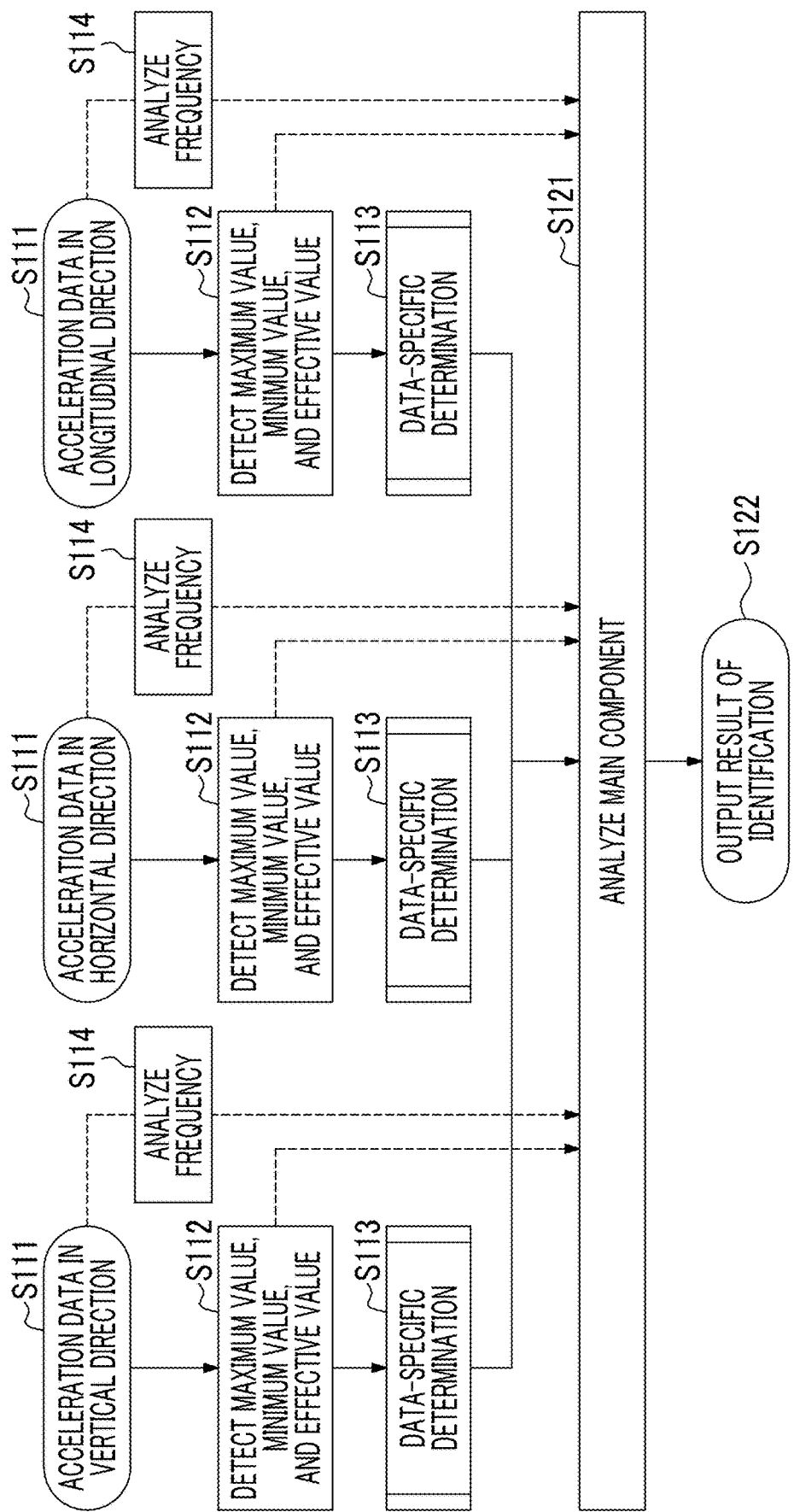
FIG. 3 is a diagram illustrating an example of a procedure of a process in which the abnormality monitoring device according to the first embodiment determines whether an abnormality is present in a vehicle and identifies a type of abnormality when an abnormality occurs.

FIG. 3 is a diagram illustrating an example of a procedure of a process in which the abnormality monitoring device 100 determines whether an abnormality is present in the vehicle 910 and identifies a type of abnormality when the abnormality occurs. The abnormality monitoring device 100 performs the process of FIG. 3 at each predetermined sampling cycle, for example.

In the process of FIG. 3, the acceleration data acquisition unit 191 acquires data of the acceleration in each of a vertical direction, a horizontal direction, and a longitudinal direction of the vehicle chassis 912 (step S111).

The abnormality presence determination unit 192 detects a maximum value, a minimum value, and an effective value of the acceleration for each piece of data of the acceleration in each of the vertical direction, the horizontal direction, and the longitudinal direction of the vehicle chassis 912 (step S112).

Then, the control unit 190 performs a data-specific determination (step S113). In the data-specific determination, the control unit 190 determines whether an abnormality is present for each of pieces of acceleration data in each of a vertical direction, a horizontal direction, and a longitudinal direction of the vehicle chassis 912. When the control unit 190 determines that an abnormality is present, the control unit 190 identifies the type of abnormality.

Figure 4:
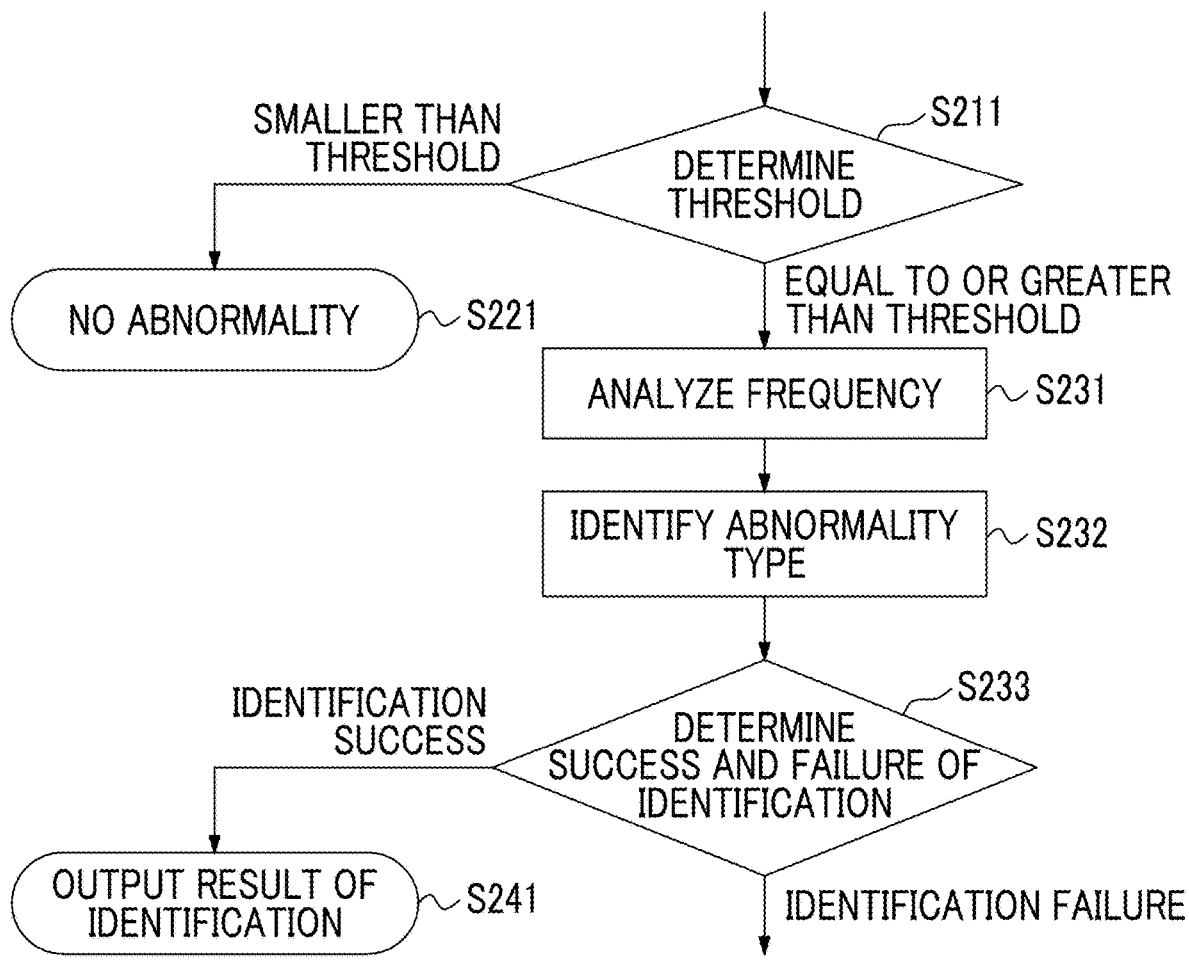
FIG. 4 is a diagram illustrating an example of a processing procedure in which a control unit according to the first embodiment performs a data-specific determination.

FIG. 4 is a diagram illustrating an example of a processing procedure in which the control unit 190 performs a data-specific determination. The control unit 190 performs a process of FIG. 4 in step S113 of FIG. 3.

In the process of FIG. 4, the abnormality presence determination unit 192 determines whether a maximum value of the absolute value of the acceleration (a magnitude of the acceleration) is equal to or greater than a predetermined threshold for each piece of the data of the acceleration of the vehicle 910 in each of the vertical direction, the horizontal direction, and the longitudinal direction (step S211).

When the abnormality presence determination unit 192 determines in step S211 that the maximum value is smaller than the threshold (step S211: smaller than the threshold), the abnormality presence determination unit 192 determines that an abnormality is not present in the data (step S221). When it is determined that an abnormality is not present in all of the pieces of data, the process of FIG. 4 ends and the process of FIG. 3 ends.

On the other hand, when the abnormality presence determination unit 192 determines that the maximum value is equal to or greater than the threshold in step S211 (step S211: equal to or greater than the threshold), the frequency analysis unit 193 performs frequency analysis on the data for which the maximum value is determined to be equal to or greater than the threshold and acquires frequency data (step S231).

Then, the abnormality type identification unit 194 identifies a type of abnormality using the obtained frequency data (step S232).

Then, the control unit 190 determines whether the identification of the type of abnormality has been successful in step S232 (step S233).

When the control unit 190 determines whether the identification of the type of abnormality has been successful for one or more pieces of data (step S233: identification success), the abnormality monitoring device 100 outputs the identified type of the abnormality (step S241). For example, the display unit 130 may display the identified type of abnormality under the control of the control unit 190. Alternatively, the communication unit 110 may transmit data indicating the identified type of abnormality to another device under the control of the control unit 190.

After step S241, the abnormality monitoring device 100 ends the process of FIG. 4 and ends the process of FIG. 3.

On the other hand, when it is determined in step S233 that the identification of the type of abnormality has failed for any data (step S233: identification failure), the abnormality monitoring device 100 ends the process of FIG. 4 and returns to the process of FIG. 3.

When it is determined in step S113 that an abnormality is present and the identification of the type of abnormality has failed for any of the data, the frequency analysis unit 193 performs frequency analysis of the acceleration data on which the frequency analysis has not been performed (step S114).

The abnormality type identification unit 194 performs main component analysis based on the acceleration data in all of the vertical direction, the horizontal direction, and the longitudinal direction of the vehicle chassis 912 (step S121). For example, the storage unit 180 may store the feature quantity and the type of abnormality in association with each other, for each type of abnormality in the vehicle 910, using the maximum value, the minimum value, the effective value, and the amplitude for each frequency band of the acceleration in each of the vertical direction, the horizontal direction, and the longitudinal direction of the vehicle chassis 912 as feature quantities. The abnormality type identification unit 194 identifies the type of abnormality by reading from the storage unit 180 the type of abnormality associated with the feature quantity most similar to the feature quantity obtained in steps S112, S113, and S114.

The abnormality monitoring device 100 outputs the type of the abnormality identified by the main component analysis (step S122). For example, the display unit 130 may display the identified type of abnormality under the control of the control unit 190. Alternatively, the communication unit 110 may transmit data indicating the identified type of abnormality to another device under the control of the control unit 190.

After step S122, the abnormality monitoring device 100 ends the process of FIG. 3.

As described above, the acceleration data acquisition unit 191 acquires the measurement data of the acceleration of the vehicle chassis 912. The abnormality presence determination unit 192 determines whether an abnormality is present on the basis of comparison between the measurement data of the acceleration of the vehicle chassis 912 acquired by the acceleration data acquisition unit 191 with the threshold. When the abnormality presence determination unit 192 determines that an abnormality is present, the frequency analysis unit 193 analyzes the frequency of the acceleration, and the abnormality type identification unit 194 identifies the type of abnormality on the basis of the pattern of the frequency.

Accordingly, when an abnormality occurs in the vehicle, it is possible to obtain information indicating the type of the abnormality.

Further, according to the abnormality monitoring device 100, the acceleration sensor may be installed in the vehicle chassis 912 of the vehicle 910, and it is not necessary for the acceleration sensor to be installed in the bogie 911. In this respect, according to the abnormality monitoring device 100, it is possible to ascertain the abnormality in the vehicle 910 using a relatively small number of sensors.

Further, when the type of abnormality cannot be identified from the pattern of the frequency, the abnormality type identification unit 194 identifies the type of abnormality on the basis of the pattern of the frequency and the measurement result of the acceleration. Accordingly, the abnormality type identification unit 194 can identify the type of abnormality on the basis of more feature quantities. In this regard, the abnormality type identification unit 194 can enhance accuracy of identification of the type of abnormality.

The abnormality monitoring device 100 may determine whether to start identification of the type of abnormality on the basis of the travel pattern of the vehicle 910, in addition to the comparison between a maximum value of an absolute value of the acceleration and a threshold.

Here, an acceleration different from an ordinary travel pattern may be generated due to a sudden brake or the like while the vehicle 910 is traveling. In this case, by determining whether to start identification of the type of abnormality on the basis of the travel pattern of the vehicle 910, it is possible to reduce a possibility of an erroneous determination in which it is determined that an abnormality occurs even when the abnormality does not occur in the vehicle 910.

Figure 5:
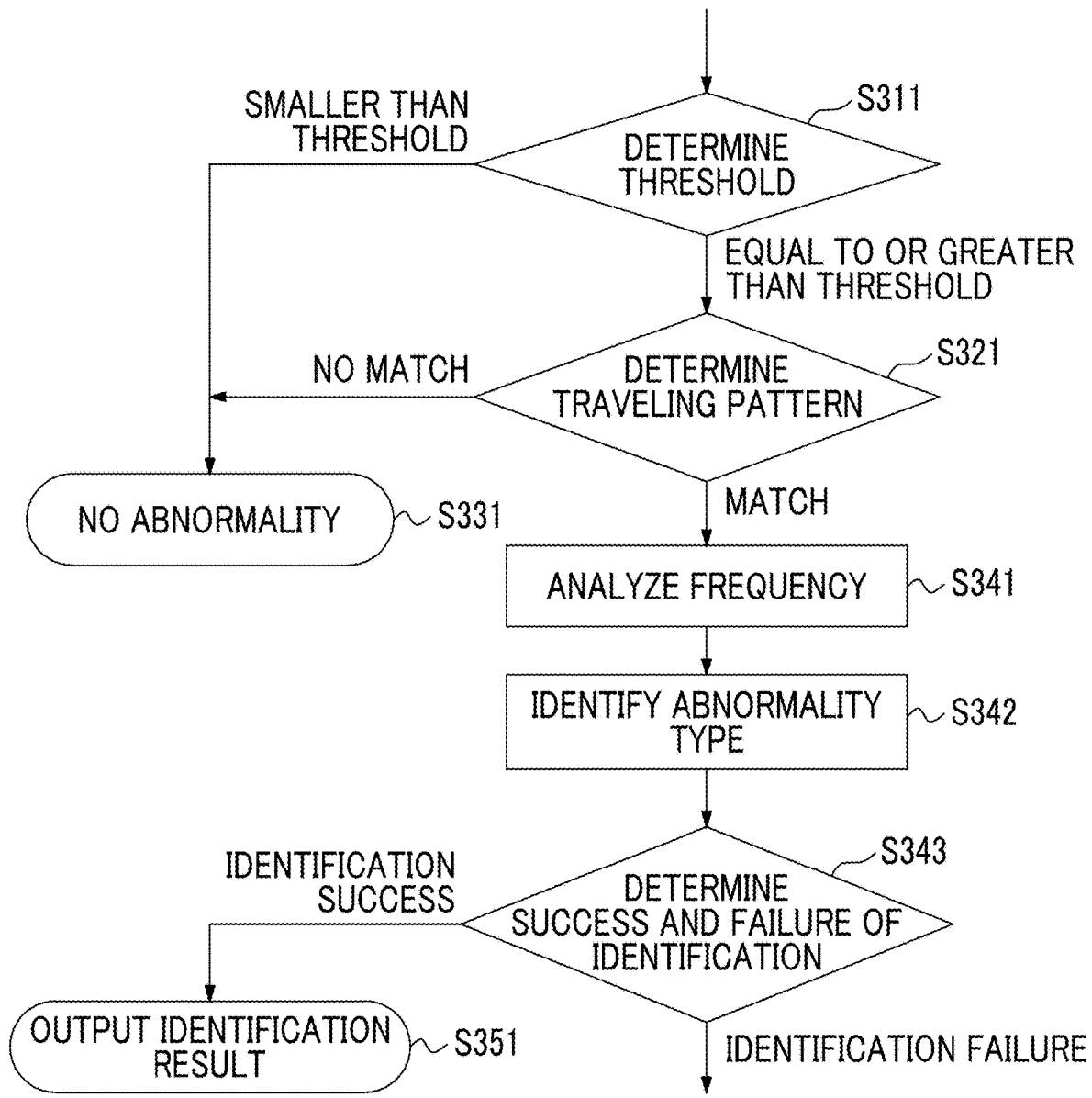
FIG. 5 is a diagram illustrating an example of a processing procedure in a case in which the abnormality monitoring device according to the first embodiment determines whether to start identification of a type of abnormality on the basis of a travel pattern of the vehicle.

FIG. 5 is a diagram illustrating an example of a processing procedure in a case in which the abnormality monitoring device 100 determines whether identification of a type of abnormality is started on the basis of the travel pattern of the vehicle 910. The abnormality monitoring device 100 performs a process of FIG. 5 instead of the process of FIG. 4 in step S113 of FIG. 3.

Step S311 in FIG. 5 is the same as step S211 in FIG. 4. In step S311, when the abnormality presence determination unit 192 determines that the maximum value of the absolute value of the acceleration is equal to or greater than the threshold (step S311: equal to or greater than the threshold), the abnormality type identification unit 194 determines whether a travel pattern of the vehicle 910 matches a predetermined pattern (step S321).

Specifically, the storage unit 180 stores acceleration pattern information indicating a longitudinal acceleration of the vehicle 910 for each kilometer or for each elapsed time from the start of traveling in advance. The abnormality type identification unit 194 determines whether the acceleration pattern indicated by the longitudinal acceleration data matches the acceleration in the acceleration pattern information. When the acceleration pattern indicated by the longitudinal acceleration data matches the acceleration in the acceleration pattern information, the abnormality type identification unit 194 determines, for example, whether an acceleration difference is within a predetermined ratio in any kilometer or time.

When the abnormality type identification unit 194 determines that the travel pattern of the vehicle 910 does not match the predetermined pattern in step S321 (step S321: no match), the process proceeds to step S331.

On the other hand, when the abnormality type identification unit 194 determines that the travel pattern of the vehicle 910 matches the predetermined pattern in step S321 (step S321: match), the process proceeds to step S341.

Step S331 is the same as step S221 of FIG. 4.

Steps S341 to S351 are the same as steps S231 to S241 in FIG. 4.

A plurality of patterns of an acceleration of the vehicle may be calculated for each of a traveling speed, a curvature and a slope of a track, and the like in the traveling simulation in advance. Even in a case in which an actual travel pattern is different from an expected travel pattern and when there is data in which a travel pattern matches the actual travel pattern, it is possible to perform a determination as to whether an abnormality is present and identification of a type of abnormality by performing comparison between the data with data in the actual traveling. Accordingly, it is possible to increase the number of sections in which the determination as to whether an abnormality is present and the identification of the type of abnormality are performed.

Further, even when the actual travel pattern is different from the expected travel pattern and in a case in which the vehicle travels the same pattern at another place on the track, data for the place may be compared with the data in actual traveling.

As described above, the abnormality type identification unit 194 determines whether to start the identification of the type of abnormality on the basis of the travel pattern of the vehicle 910.

Accordingly, when an acceleration different from an ordinary travel pattern of the vehicle 910 is generated, it is possible to reduce a possibility of erroneous determination in which the abnormality monitoring device 100 determines that an abnormality occurs even when the abnormality does not occur in the vehicle 910.

The abnormality monitoring device 100 may perform a determination as to an abnormality in the track 920 in addition to or instead of the determination as to an abnormality in the vehicle 910.

Figure 6:
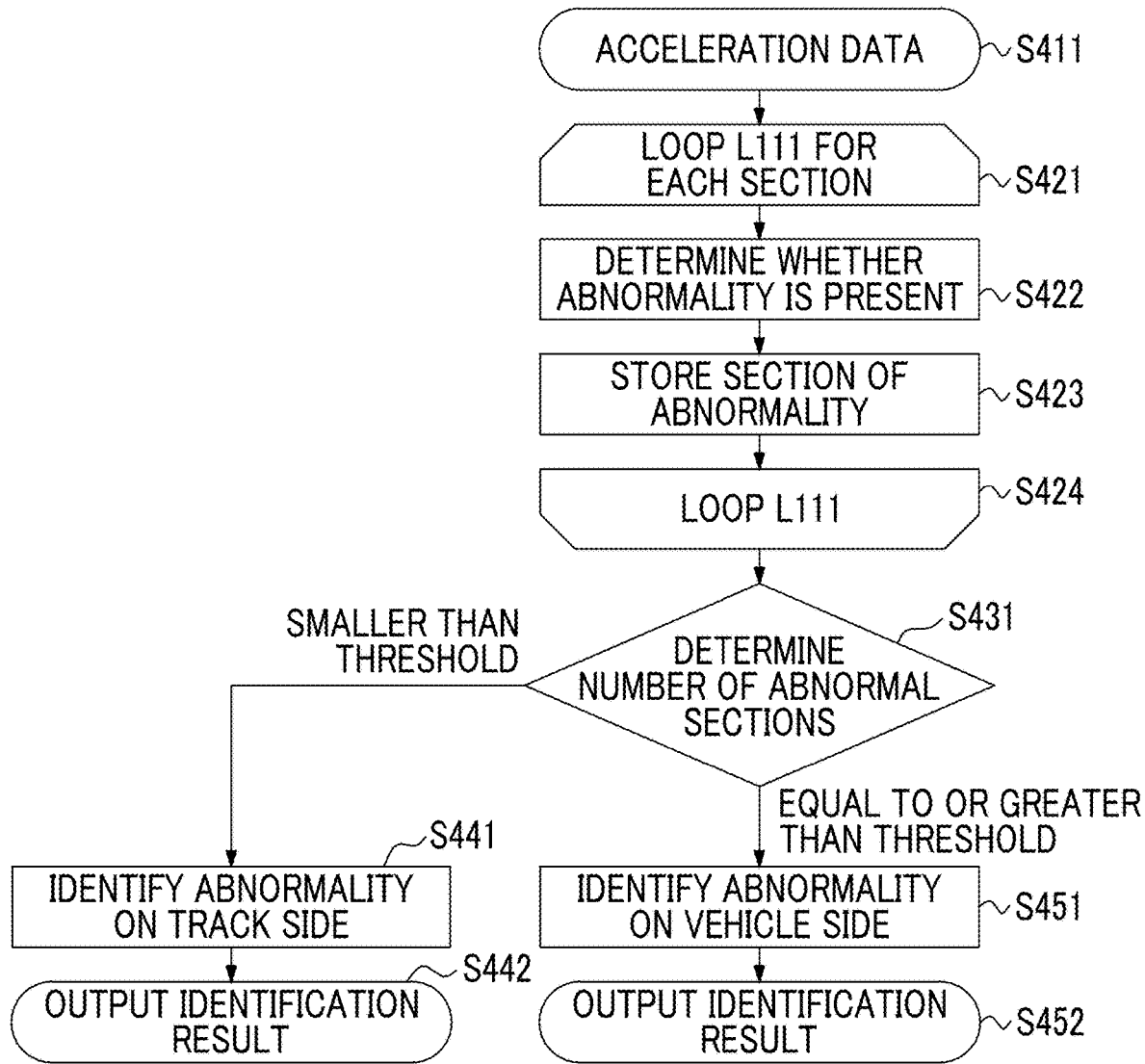
FIG. 6 is a diagram illustrating an example of a procedure of a process in which the abnormality monitoring device according to the first embodiment determines an abnormality in a vehicle and an abnormality in a track.

FIG. 6 is a diagram illustrating an example of a procedure of a process in which the abnormality monitoring device 100 performs a determination as to an abnormality in the vehicle 910 and an abnormality in the track 920.

In the process of FIG. 6, the acceleration data acquisition unit 191 acquires acceleration data of the vehicle 910 in each of the vertical direction, the horizontal direction, and the longitudinal direction (step S411).

Then, the control unit 190 starts a loop L111 for performing a process for each section set in the track 920 (step S421).

Then, the abnormality presence determination unit 192 determines whether an abnormality is present (step S422). The abnormality presence determination unit 192 compares a maximum value of an absolute value of the acceleration with the threshold to determine whether an abnormality is present, for example, as in step S211 of FIG. 4.

When the abnormality presence determination unit 192 determines that an abnormality is present in step S422, the storage unit 180 stores information indicating a section in which it is determined that the abnormality is present under the control of the control unit 190 (step S423).

The control unit 190 performs termination processing of the loop L111 (step S424). The control unit 190 determines whether the process of the loop L111 has been performed on all sections that are management targets in the track 920. When the control unit 190 determines that there is an unprocessed section, the process returns to step S421 and the control unit 190 continues to perform the process of loop L111 on the unprocessed section. On the other hand, when the control unit 190 determines that the process of the loop L111 has been performed for all the sections that are targets, the control unit 190 ends the loop L111.

When the loop L111 ends in step S424, the control unit 190 determines whether the number of sections in which it is determined that an abnormality is present is equal to or greater than a predetermined threshold (step S431).

When the control unit 190 determines that the number of sections in which it is determined that an abnormality is present is smaller than the threshold (step S431: smaller than the threshold), the abnormality type identification unit 194 identifies an abnormality in the track 920 (step S441). For example, the abnormality type identification unit 194 identifies an abnormality such as adhesion of foreign matters to a road surface or a depression of the road surface in the section determined to be abnormal.

The abnormality monitoring device 100 ends the process of FIG. 6 after outputting a result of the identification (step S442).

On the other hand, when the control unit 190 determines that the number of sections in which it is determined that an abnormality is present is equal to or greater than the threshold (step S431: equal to or greater than the threshold), the abnormality type identification unit 194 identifies an abnormality in the vehicle 910 (step S451). For example, the abnormality type identification unit 194 performs the same process as in the case of FIGS. 3 to 4.

The abnormality monitoring device 100 ends the process of FIG. 6 after outputting a result of the identification (step S452).

As described above, when the abnormality presence determination unit 192 determines that an abnormality is present in a certain section among the sections of the track 920 and determines that an abnormality is not present in other sections, the abnormality type identification unit 194 determines that the abnormality is likely to be on the track 920 side. For example, the abnormality type identification unit 194 separates the abnormality in the track 920 and the abnormality in the vehicle 910 on the basis of the number of sections in which it is determined that an abnormality is present as described above.

Accordingly, the abnormality monitoring device 100 can detect an abnormality in the track 920 by monitoring the vehicle 910 without the need to install a sensor or the like in the track 920.

Second Embodiment

Figure 7:
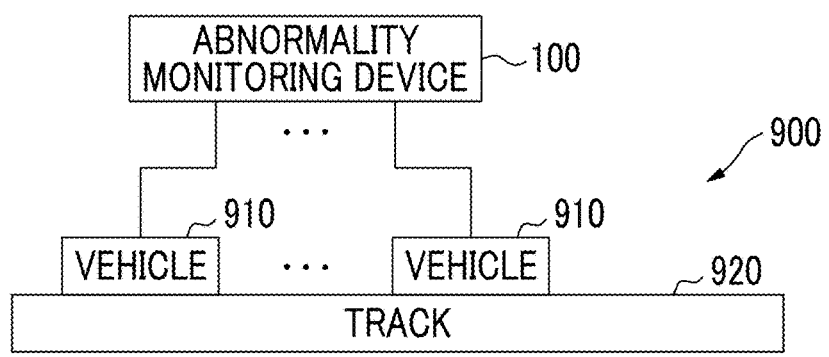
FIG. 7 is a diagram illustrating an example of a management target of the abnormality monitoring device according to a second embodiment.

FIG. 7 is a diagram illustrating an example of a management target of the abnormality monitoring device 100 according to a second embodiment of the present invention. As illustrated in FIG. 7, the abnormality monitoring device 100 acquires acceleration data from each of a plurality of vehicles 910, which are monitoring targets.

A configuration of the abnormality monitoring device 100 and a configuration of each of the vehicles 910 are the same as in the case of FIG. 1.

In a configuration of FIG. 7, when the abnormality presence determination unit 192 determines that an abnormality is present for a plurality of vehicles in the same section of the track 920, the abnormality type identification unit 194 identifies an abnormality in the track 920.

The determination as to the presence or absence of the abnormality in the vehicle 910 and the identification of the type of the abnormality are the same as in the case of the first embodiment.

Here, it is possible to perform a determination as to an abnormality with higher accuracy by collecting travel data of respective vehicles of which weight conditions are equal. Since an internal pressure of the air spring is substantially determined according to a weight of passengers, for example, a plurality of groups are defined according to the internal pressure of the air spring. The acceleration data is classified into groups according to a magnitude of the internal pressure that is measured at the time of traveling.

When passengers are getting on and off at a station, a change in weight causes the internal pressure of the air spring to change. Further, the internal pressure of the air spring always changes due to vibration of the vehicle chassis during traveling. Therefore, an average value for several seconds until the vehicle departs after a door is closed at the station, for which the change in internal pressure of the air spring seems to be the smallest, is set as a value of the internal pressure of the air spring.

For data of each group classified according to the magnitude of the internal pressure of the air spring, data of the acceleration per traveling distance (for example, about a kilometer) is divided into sections having a relatively short distance such as about 10 meters. The abnormality monitoring device 100 may perform a determination as to whether an abnormality is present and identification of a type of abnormality through, for example, analysis of a maximum value, an effective value, and a frequency of the acceleration, as described above, for each of the divided sections.

The abnormality monitoring device 100 may identify an abnormality in a portion related to the bogie 911 when a period of the abnormality in the vehicle 910 becomes shorter in inverse proportion to the traveling speed. For example, when a flat spot occurs on a traveling wheel, a frequency at which vibration is generated can be estimated from the traveling speed and the diameter of the traveling wheel. Accordingly, causes can be estimated according to the result of the frequency analysis.

For the abnormality in the vehicle 910, when a vibration having a low correlation with the traveling speed is generated, the abnormality monitoring device 100 may identify the abnormality as an abnormality in the vehicle chassis 912.

On the other hand, for an abnormality in the track 920, the abnormality monitoring device 100 may calculate a wavelength of track irregularity that is a main factor of an increase in the acceleration from a main frequency of the traveling speed and the acceleration of the vehicle 910. A result of this calculation of the wavelength can be useful for study of a correction procedure of the track irregularity.

As described above, the acceleration data acquisition unit 191 acquires the measurement data of the acceleration from the plurality of vehicle chassis 912. When the abnormality presence determination unit 192 determines that an abnormality is present in the same section among the sections of the track for each of the pieces of measurement data of the acceleration from the plurality of vehicle chassis, the abnormality type identification unit 194 determines that an abnormality is likely to be on the track side.

Accordingly, the abnormality monitoring device 100 can detect an abnormality in the track 920 with higher accuracy.

The process of each unit may be performed by recording a program for realizing all or some of functions of the control unit 190 in a computer-readable recording medium, loading the program recorded on the recording medium to a computer system, and executing the program. The "computer system" described herein includes an OS or hardware such as a peripheral device.

The "computer system" also includes a homepage providing environment (or a display environment) when a WWW system is used.

Further, the "computer-readable recording medium" includes a portable medium such as a flexible disk, a magneto-optical disc, a ROM, or a CD-ROM, or a storage device such as a hard disk built in the computer system.

Further, the above program may be a program for realizing some of the above-described functions.

Alternatively, the program may be a program capable of realizing the above-described functions in combination with a program previously recorded in a computer system.

Although the embodiments of the present invention have been described above in detail with reference to the drawings, specific configurations are not limited to the embodiments, and design changes and the like without departing from the gist of the present invention are included.

INDUSTRIAL APPLICABILITY

The embodiments of the present invention relate to an abnormality monitoring device including an acceleration data acquisition unit that acquires measurement data of an acceleration of a vehicle chassis, an abnormality presence determination unit that determines whether an abnormality is present on the basis of comparison between the acceleration and a threshold, a frequency analysis unit that analyzes a frequency of the acceleration when the abnormality presence determination unit determines that an abnormality is present, and an abnormality type identification unit that identifies a type of abnormality on the basis of a pattern of the frequency.

According to this embodiment, when an abnormality occurs in the vehicle, it is possible to obtain information indicating a type of the abnormality.

REFERENCE SIGNS LIST

100 Abnormality monitoring device
110 Communication unit
120 Operation input unit
130 Display unit
180 Storage unit
190 Control unit
191 Acceleration data acquisition unit
192 Abnormality presence determination unit
193 Frequency analysis unit
194 Abnormality type identification unit
900 Traffic system
910 Vehicle
911 Bogie
912 Vehicle chassis
913 Acceleration sensor
920 Track

The invention claimed is:

1. An abnormality monitoring device comprising:
a memory configured to store instructions; and
a processor configured to execute the instructions to:
   acquire measurement data of an acceleration of a vehicle chassis;
   determine whether an abnormality is present on a basis of comparison between the acceleration and a threshold;
   analyze a frequency of the acceleration when it is determined that an abnormality is present;
   identify a type of abnormality on a basis of a pattern of the frequency; and
   determine whether to start identification of the type of abnormality by comparing a travel pattern of a vehicle including the vehicle chassis with a predetermined pattern indicating an acceleration for each kilometer or each elapsed time.

2. The abnormality monitoring device according to claim 1, wherein the processor is configured to execute the instructions to identify the type of abnormality on the basis of the pattern of the frequency and a measurement result of the acceleration when the processor is unable to identify the type of abnormality from the pattern of the frequency.

3. The abnormality monitoring device according to claim 1, wherein the processor is configured to execute the instructions to determine that an abnormality is likely to be on a track side when it is determined that an abnormality is present in a certain section among sections of the track and it is determined that an abnormality is not present in other sections.

4. The abnormality monitoring device according to claim 1, wherein the processor is configured to execute the instructions to:

acquire measurement data of an acceleration from a plurality of vehicle chassis; and determine that an abnormality is likely to be on a track side when it is determined that an abnormality is present in a same section among sections of the track for each of pieces of measurement data of the acceleration from a plurality of vehicle chassis.

5. An abnormality monitoring method executed by a processor, comprising steps of:

acquiring measurement data of an acceleration of a vehicle chassis;

determining whether an abnormality is present on a basis of comparison between the acceleration and a threshold;

analyzing a frequency of the acceleration when it is determined that an abnormality is present;

identifying a type of abnormality on a basis of a pattern of the frequency; and determining whether to start identification of the type of abnormality by comparing a travel pattern of a vehicle including the vehicle chassis with a predetermined pattern indicating an acceleration for each kilometer or each elapsed time.

6. A non-transitory computer-readable recording medium that stores a program for causing a computer to execute steps of:

acquiring measurement data of an acceleration of a vehicle chassis;

determining whether an abnormality is present on a basis of comparison between the acceleration and a threshold;

analyzing a frequency of the acceleration when it is determined that an abnormality is present;

identifying a type of abnormality on a basis of a pattern of the frequency; and determining whether to start identification of the type of abnormality by comparing a travel pattern of a vehicle including the vehicle chassis with a predetermined pattern indicating an acceleration for each kilometer or each elapsed time.

* * * * *